(12) United States Patent
Arssov

(10) Patent No.: US 8,214,571 B2
(45) Date of Patent: Jul. 3, 2012

(54) SIMPLE SERIAL INTERFACE—METHOD OF COMMUNICATION AND INFORMATION EXCHANGE, AND ELECTRONIC DEVICES BASED ON THIS METHOD

(76) Inventor: Paul (Plamen) Arssov, San Diego, CA (US)

( * ) Notice: Subject to any disclaimer, the term of this patent is extended or adjusted under 35 U.S.C. 154(b) by 892 days.

(21) Appl. No.: 11/768,183

(22) Filed: Jun. 25, 2007

(65) Prior Publication Data

US 2008/0320189 A1    Dec. 25, 2008

(51) Int. Cl.
  *G06F 13/42*    (2006.01)
(52) U.S. Cl. .......................................... 710/105; 710/36
(58) Field of Classification Search ............... 710/36, 710/40, 105, 240
  See application file for complete search history.

(56) References Cited

U.S. PATENT DOCUMENTS 5,784,648 A *   7/1998  Duckwall ..................... 710/40
  2007/0145154 A1 *  6/2007  Yu et al. ........................ 235/492

* cited by examiner

*Primary Examiner* — Clifford Knoll

(57) ABSTRACT

A new simple serial interface method and device based on this method, which reduces the complexity of the existing universal serial bus (USB) interface, and allows fast and efficient data exchange, and quick development of hardware and software for this device.

The method allows equal exchange of information between 2 participants wherein:
  each participant can initiate sending of information,
  the data exchange can occur at any time, with no wait or a reference in a 'frame'.

The device based on the method implemented as:
  separate UTMI or wireless interface chip and separate control chip,
  single chip which includes UTMI or wireless part, and control part,
  special mode included in the existing—USB host, USB device, USB OTG chips.

12 Claims, 3 Drawing Sheets

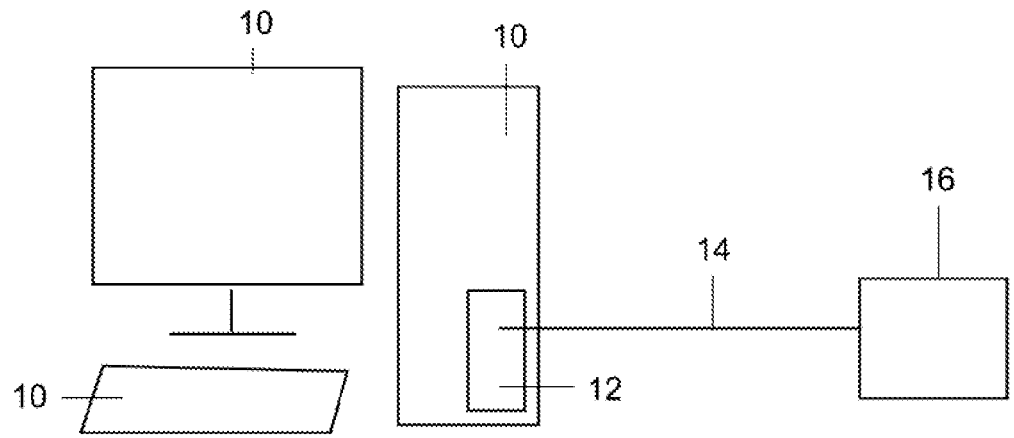
FIG.1.1
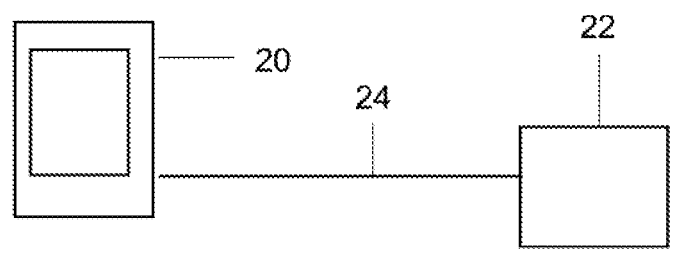
FIG.1.2
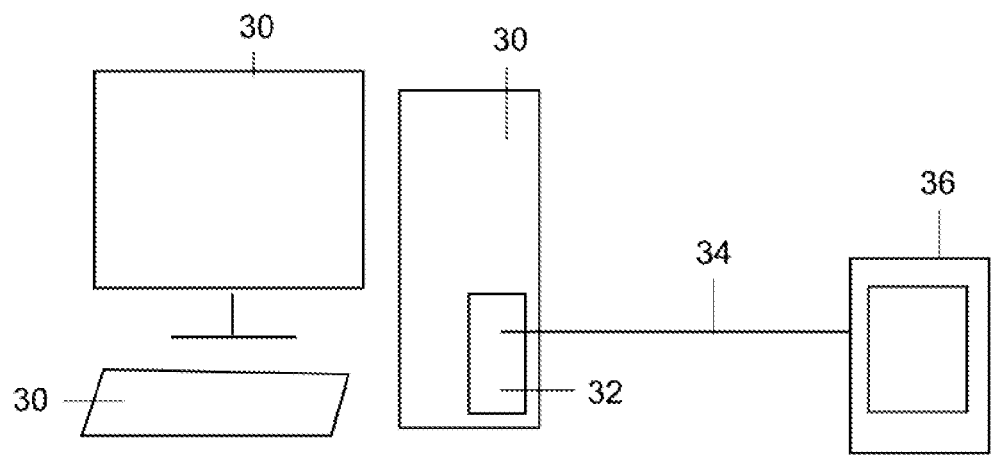
FIG.1.3

FIG.2.1

FIG.3
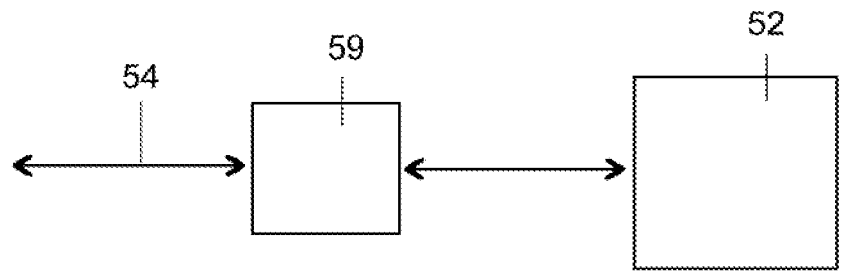
FIG.3.1
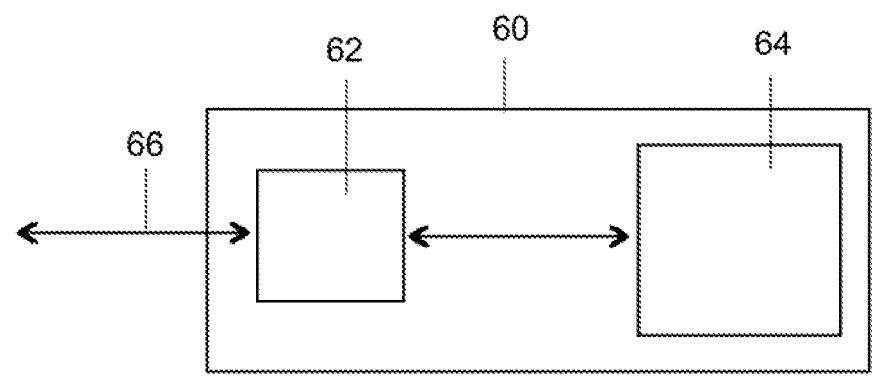
FIG.3.2
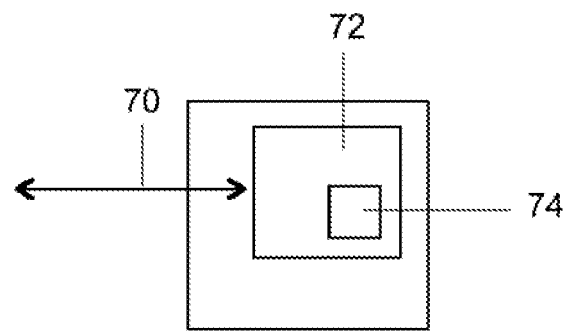
FIG.3.3

SIMPLE SERIAL INTERFACE—METHOD OF COMMUNICATION AND INFORMATION EXCHANGE, AND ELECTRONIC DEVICES BASED ON THIS METHOD

BACKGROUND OF THE INVENTION

1. Field of the Invention

The invention herein relates to computer interfaces, and to data exchange.

2. Description of Related Art

In general, the information exchange between electronic devices occurs on 2 levels:
- electrical level—driving different levels of signals to exchange information,
- protocol level—organizing the information in a specific way as to be meaningful for the parties exchanging information.

In the existing standard (wired) or the wireless USB interface:
- on electrical level—it uses the UTMI or wireless interface,
- on protocol level—the information exchange is defined between 2 sides, each with a different behavior.

In particular, the protocol level as defined in the documents on the USB specification, found on www.usb.org, defines 3 types of participants—'host', 'device', 'on the go' (OTG—which includes host and device), where:
- host—generates 'frames', and initiates requests for sending and receiving information,
- device—receives 'frames', receives the requests for sending and receiving information, and responds accordingly,
- OTG—does a preliminary selection as to become a host or device and behaves as one of the above ways, as a device or a host.

Currently the USB protocol level has the following significant limitations:
- standard computer system is equipped with a 'host' controller, and can communicate only with a 'device'; the existing USB interface does not allow direct communication between 2 computer systems equipped with 'host' controllers,
- the protocol level requires significant additional information—overhead, added to the useful information; one example is the 'control' type transaction—for ex. Requiring 56 bytes of additional information required by the protocol in order to send 8 bytes of useful data,
- the protocol level defines and requires a complex way of connecting between 2 participants—the USB host has to read descriptors from the USB device, set address, set configuration/interface, do a specific type of transfer—bulk, control, isochronous, etc.,
- the protocol level defines abstractions called 'pipes' which allow sending receiving information in a defined way; the resulting implementation in hardware and software has to deal with the pre-defined way of using a particular type of 'pipe'.

SUMMARY OF THE INVENTION

The invention—simple serial interface method and devices based on this method comprises of:
- on electrical level—still uses the UTMI or the electrical level of a wireless USB interface,
- on protocol level—uses 2 sides, however reduces the complexity related to USB exchange, by having each side capable of initiating data exchange.

In particular—each side can send and receive at any moment of time and not on defined intervals—'frames'. The data exchange do not follow a rigid protocol, it is flexible and can be re-defined and modified, if needed.

In addition the SSI method and devices based on this method allows:
- direct communications between 2 computer systems,
- allows short information exchange, and data transfers starting from 1 byte.

The way of connecting between 2 devices based on SSI method allows immediate exchange, after connecting physically. The data exchange can start immediately, and do not depend on the start of the 'frame'.

The protocol level is not predefined, and allows minimum or no additional required information—overhead. In this way the basic bandwidth of the electrical level—the UTMI or wireless interface is used most efficiently. What is more, the resulting implementation in hardware and software is simple and efficient as well.

BRIEF DESCRIPTION OF THE DRAWINGS

FIG. 1. has number of diagrams showing the existing USB information exchange.

FIG. 1.1. is a diagram showing the communication between USB host and USB device.

FIG. 1.2. is a diagram showing the communication between an OTG host and device.

FIG. 1.3. is a diagram showing the communication between USB host and OTG device.

FIG. 2.1. is a diagram showing the communication between 2 SSI devices.

FIG. 3. has number of diagrams showing the SSI implementation.

FIG. 3.1. is a diagram showing the implementation 1—separate UTMI interface chip and separate control chip.

FIG. 3.2. is a diagram showing the implementation 2—single chip which includes UTMI and control chip.

FIG. 3.3. is a diagram showing the implementation 3—special mode included in the existing USB host, USB device, USB OTG.

DETAILED DESCRIPTION OF THE INVENTION

Figure 2:
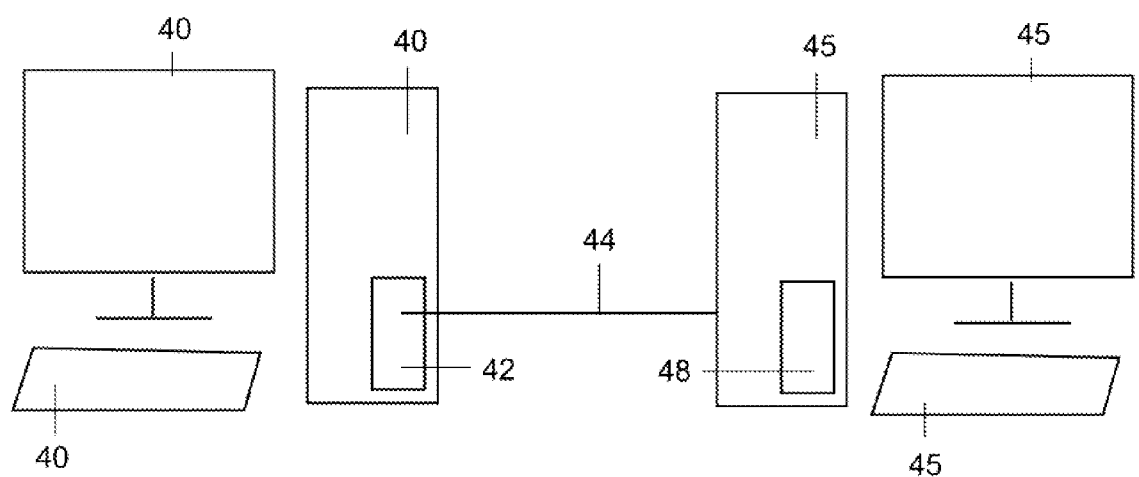
FIG. 2. has one diagram showing the SSI information exchange.

FIG. 1 shows the existing and prior art USB information exchange and includes:
- FIG. 1.1. communication between USB host and USB device (computer to disk),
- FIG. 1.2. communication between an OTG host and device (PDA to disk),
- FIG. 1.3. communication between USB host and OTG device (computer to PDA).

On FIG. 1.1 the computer (including monitor and keyboard) 10 includes in its hardware the USB host controller 12, which is connected via the USB cable 14 to the USB device 16.

One example of this communication is the exchange between a desktop computer equipped with USB host controller and USB disk device.

On FIG. 1.2. the USB OTG device is 20 is connected via the USB cable 24 to the USB device 22.

One example of this communication is the exchange between PDA and USB disk device.

On FIG. 1.3 the computer 30 includes in its hardware the USB host controller 32 which is connected via the USB cable 34 to the USB OTG device 36.

One example of this communication is the exchange between a desktop computer equipped with USB host controller and PDA as USB OTG device.

FIG. 2. shows SSI information exchange.

On FIG. 2.1 the computer 40 (including monitor and keyboard) includes an SSI device controller 42, and connects via USB cable 44 to the computer 46 (including monitor and keyboard) which also includes SSI controller 48.

One example of the communication and data exchange is between 2 desktop or notebook computer systems. The SSI device controller can be utilized not only in a computer system, but also in any other configuration which includes the SSI device controller.

The invention can be reduced into practice in many different ways, including:

having an UTMI or wireless interface chip—connected to a control chip, based on programmable logic or a custom logic chip, providing the control for the interface chip and the use in a specific application, having one custom chip which includes the interface and control portions as described above, adding a specific mode in the different USB exchange participants—host, device, OTG; in this mode the particular participant can send and receive 'raw' information, outside of the requirements of the USB protocol; the sending/receiving can occur in any moment, with no restriction or relation to the USB 'frames'.

FIG. 3. shows SSI implementation, particular for wired devices, and includes:

FIG. 3.1. implementation 1—separate UTMI interface chip and separate control chip, FIG. 3.2. implementation 2—single chip which includes UTMI and control chip, FIG. 3.3. implementation 3—special mode included in the existing—USB host, USB device, USB OTG chips.

On FIG. 3.1. the UTMI interface signals 54 connect to the UTMI interface chip 59, which is connected to controller chip 52.

One example of this implementation is with a standard UTMI interface chip and an FPGA or a microcontroller, as a controller chip.

On FIG. 3.2. the UTMI interface signals 66 connect to SSI chip 60, which includes in itself the UTMI interface portion 62 and controller chip portion 64.

One example of this implementation is a custom designed chip.

On FIG. 3.3 the USB interface signals 70 connect to USB chip 72—which can be a USB host or device or OTG. Inside the chip hardware of 72, there is the SSI method 74 implemented.

One example of this implementation is a new version of the existing USB host, USB device, USB OTG chips which has a special mode included the SSI method.

Another mode of operation and alternative implementation is in a wireless USB implementation, where the connecting, sending and receiving are done wirelessly. The electrical level of the said implementation is used for data exchange in the same way as in the described above wired (UTMI) interface.

The implementing of the method in a device with electronic components and software program will be well known for those with ordinary skills in hardware and software design.

The best mode of operation is for electronic devices implemented using the SSI method for short, and fast data exchange—for example sending/receiving of an amount of data of 1 to 56 bytes. The best mode is not limited in the amount of data transferred.

The best mode will specifically help the data exchange between devices, or devices and computer systems, based on parallel type buses—like ISA, PCMCIA, PCI, where the exchange needs to be as fast as possible and the data can be as little as one byte.

The invention claimed is:

1. A method of communication and information exchange wherein:

uses the electrical level interface of the standard USB interface—UTMI, and has 2 equal sides of data exchange, and does not use the specific protocol level of USB interface, and each of the side can initiate sending of information to the other side, unlike the USB interface where only the side defined as 'host' can initiate sending, and provides information exchange which can occur at any time, without arbitration and waiting for pre-defined 'frames' times as in the USB interface, and allows exchange of useful information and data starting from 1 byte, and unlimited in size.

2. A method of communication and information exchange wherein:

uses the electrical signal interface of a wireless USB interface, has 2 equal sides of data exchange, and does not use the specific protocol level of USB interface, and each of the side can initiate sending of information to the other side, unlike the USB interface where only the side defined as 'host' can initiate sending, and provides information exchange which can occur at any time without arbitration and waiting for pre-defined 'frames' times as in the USB interface, and allows exchange of useful information and data starting from 1 byte, and unlimited in size.

3. Electronic devices implemented with standard USB connectors using the method from claim 1.

4. Electronic devices implemented with standard USB connectors using the method from claim 2.

5. The electronic devices from claim 3 or claim 4, allowing direct electrical connection and the communication between 2 computer systems, with no intermediate conversion devices.

6. The electronic devices from claim 3 or claim 4, allowing data exchange between peripheral devices, or peripheral devices and computer systems, based on parallel type buses —including but not limited to ISA, PCMCIA, PCI buses.

7. The electronic devices from claim 3, implemented as 2 chips—UTMI interface chip and control chip.

8. The electronic devices from claim 3, implemented as 1 chip which includes UTMI interface and control parts.

9. The electronic devices from claim 4, implemented as 2 chips—wireless interface chip and control chip.

10. The electronic devices from claim 4, implemented as 1 chip which includes wireless interface and control parts.

11. The electronic devices from claim 3 or claim 4, where the methods from claim 1 or claim 2 are defined as a special additional mode of communication included in a standard USB electronic components which provide the 'host', 'device' and 'OTG' functionality.

12. The electronic devices from claim 3 or claim 4, where the implementation uses the standard USB cables and connectors.

* * * * *